Aug. 7, 1956 C. VAN HOEK ET AL 2,758,083
MULTICELL ELECTRODIALYSIS APPARATUS
Filed Sept. 17, 1953 3 Sheets-Sheet 3
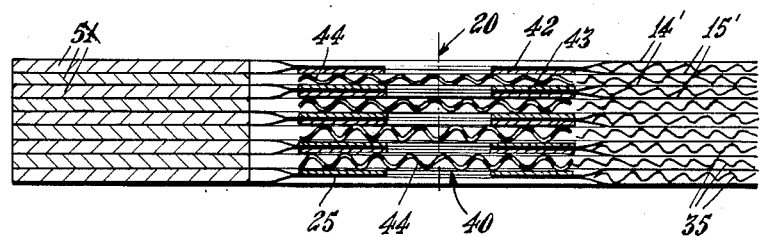
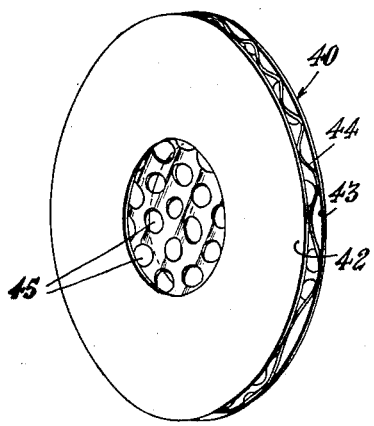
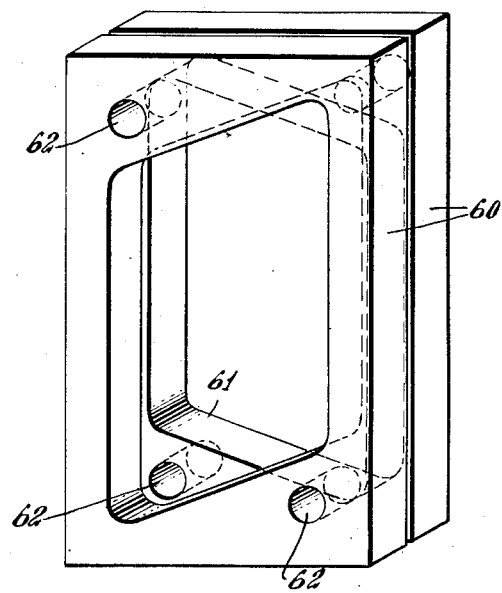
INVENTOR:
CORNELIS VAN HOEK ET AL
BY
ATTORNEY

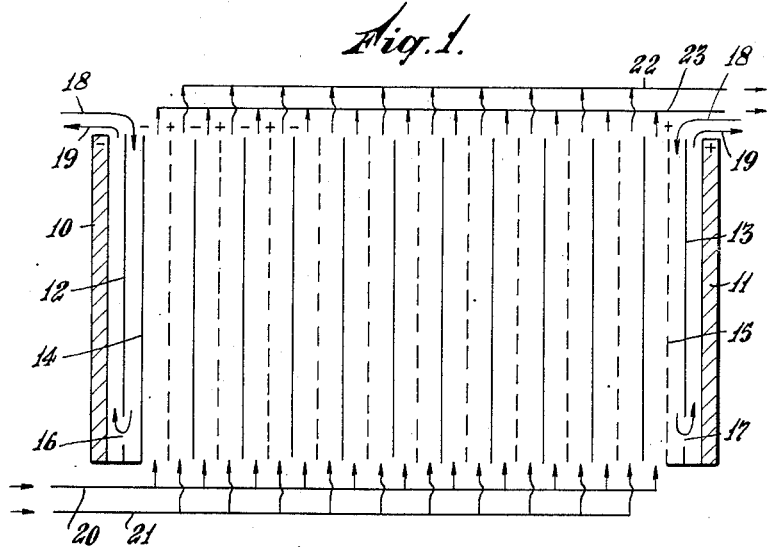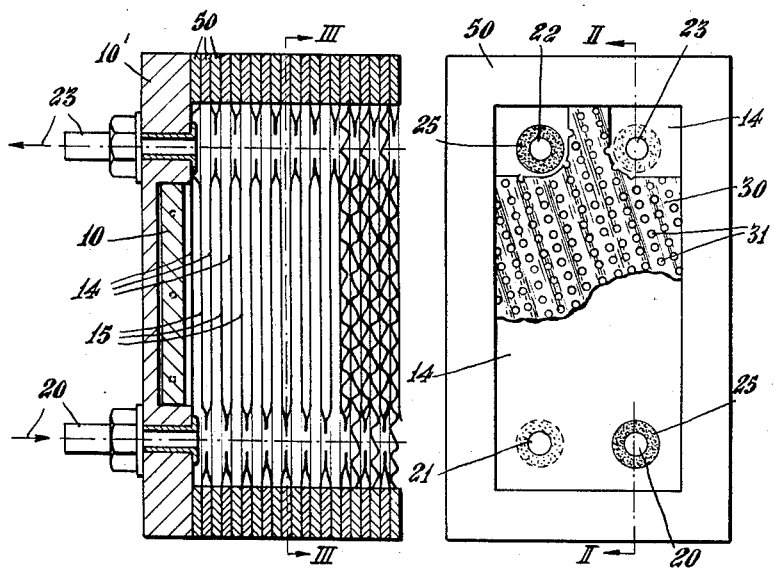

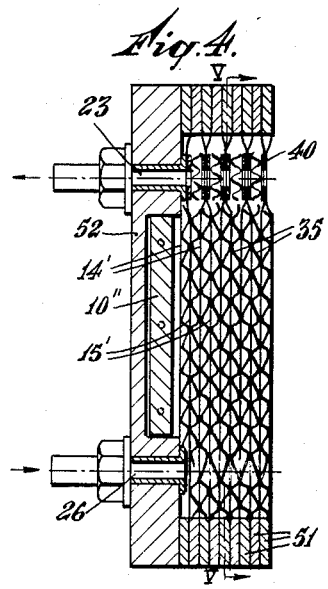
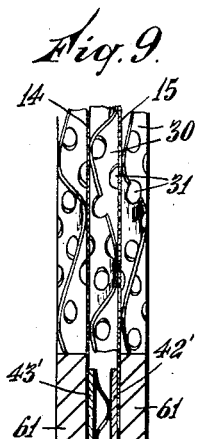
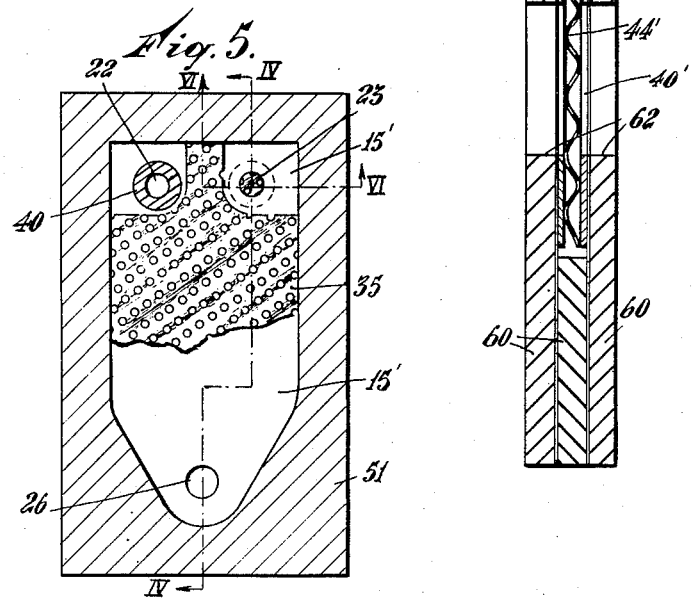

United States Patent Office 2,758,083
Patented Aug. 7, 1956

2,758,083

MULTICELL ELECTRODIALYSIS APPARATUS

Cornelis Van Hoek, Wassenaar, Netherlands, and Sybrandus Gerhardus Wiechers, Pretoria, Transvaal, Union of South Africa, assignors to Nederlandse Centrale Organisatie Voor Toegepast-Natuurwetenschappelijk Onderzoek, The Hague, Netherlands, a corporation of the Netherlands Application September 17, 1953, Serial No. 380,831

Claims priority, application Great Britain September 23, 1952

17 Claims. (Cl. 204—301)

This invention relates to a multi-cell electrodialysis apparatus. More particularly it deals with the manner in which the inlets and outlets of a plurality of alternate flat diluting or dialysis and concentrating or membrane rinsing cells separated by common membranes, are assembled by locating said inlets and outlets in the membranes themselves. Such dialysis apparatus may be used for the removal of electrolytes from solutions, such as for example, the separation or concentration of fluids by dialysis or electrodialysis including the preparation of drinking water, water for industry, irrigation water for crops, and the like, from brackish water.

Previously, such multi-cell electrodialysis apparatus consumed comparatively large amounts of electrical energy, and in order to increase their output, a large number of cells were combined between two electrodes, and the closer together the membranes between the cells the greater their efficiency. However, in making these flat cells, their separate inputs and outputs also were small and previously were made in the edges of the frame clamped between adjacent membranes, which was a limitation as to how close the membranes of the cells could be placed together.

Accordingly, it is an object of the present invention to produce a simple, efficient, effective and economic multi-cell electrodialysis apparatus in which the membranes may be spaced as close as about 3/10 of a millimeter.

Another object is to produce a multi-cell electrodialysis apparatus in which the inlets and outlets of each cell are leakproof.

Another object is to produce such a multi-cell electrodialysis apparatus in which the membranes held between the frame of the cells may be readily replaced when worn out without employing new frames also.

Another object is to produce a 200 or more multi-cell electrodialysis apparatus which does not consume too much electrical energy.

Generally speaking, the present invention deals with the forming of the inlets and outlets of alternate cells of a multi-cell dialysis apparatus, through holes in the membranes themselves, which holes are aligned for all the membranes of the cells, with successive pairs of said membranes having the edges or borders of their alternate holes connected or held together to form an accordion type stack of membrane sheets. Each cell membrane has at least three and possibly four holes or apertures, since each membrane is a common wall between two cells. One of the apertures is employed for the concentrating or membrane rinsing fluid outlet, another for diluting or dialysis fluid outlet, and the remaining apertures for the fluid inlet or inlets. Since the membranes are preferably made out of flexible material, including plastic sheets, the edges of the holes formed in adjacent pairs of the membranes may be sealed, glued or pressed together directly, or to a common frame or supporting member, with a relatively resilient and porous pressing and spacing member between them, so that all of the cell inlets and outlets may be sealed or held together under pressure at the same time. Between the membranes comprising each cell, there also may be provided spacers and/or fluid channeling members to provide regular and uniform flow of the diluting or dialysate and concentrating or membrane rinsing fluid through the cells.

The above mentioned and other features and objects of this invention and the manner of attaining them are given more specific disclosure in the following description of embodiments of the invention taken in conjunction with the accompanying drawings, wherein:

Fig. 1 is a schematic sectional view of a multi-cell electrodialysis apparatus of the type to which the present invention may be advantageously applied;

Fig. 2 is a vertical section of one end of an electrodialysis apparatus taken along line II—II of Fig. 3, showing an inlet and an outlet for a different plurality of cells as well as their supporting frames and some of the spacers which may be employed between them;

Fig. 3 is a section taken along line III—III in Fig. 2 with part of one of the spacers broken away, showing one form of a connection between the two inlets and the two outlets of a cell;

Fig. 4 is a vertical section taken along line IV—IV in Fig. 5 of part of a modified apparatus similar to that shown in Fig. 2 and also having a common inlet for all the cells;

Fig. 5 is a view along line V—V in Fig. 4 with part of one of the spacers broken away;

Fig. 6 is an enlarged sectional view taken along line VI—VI of Fig. 5 showing the detail of the spacer members between pairs of openings in the cell membranes;

Fig. 7 is a perspective view of one of the pressing or spacer members employed between the holes of separate adjacent pairs of membranes shown in Fig. 6;

Fig. 8 is a perspective view of another form of a pair of frames employed for holding a membrane between them, said frames being exaggerated in thickness to show how they also may connect the inlets and outlets of successive membranes; and Fig. 9 is an enlarged sectional view of one corner of the type of frames shown in Fig. 8 employing between alternate frames a spacer or pressing member as shown in Fig. 7.

Referring first to Fig. 1, the type of multi-cell electrodialysis apparatus to which the present invention is applied, will be explained schematically. In this particular type of dialysis apparatus the electrodes are placed at the ends and at least two membranes are placed between them to form at least three cells, two for the concentrating liquids and the other for the diluting liquid. However, the present application is a multi-cell apparatus in which at the left is shown a cathode 10 and at the right an anode 11, and between them are placed a plurality of membranes. The partition against each electrode 10 and 11, namely 12 and 13, may be formed of a different material than that of the dialysis membranes 14 and 15, which are shown, respectively, to be negative and positive, that is, they are selective respectively to the passage of positive and negative ions in the liquids of the cells.

The membranes 14 and 15 are preferably made of a plastic material, such as cellophane or polyvinyl alcohol sheets, and may be made selective to ions by the introduction of active ion groups in the membrane itself, such as sulphonic radicals or carboxylic groups in the negative membrane, and quaternary ammonium radicals in the positive membrane. These types of membranes are more fully discussed in the United States co-pending patent applications of Roebersen and Van Bochove, Serial No. 335,582, filed February 6, 1953, and of Nieuwenhuis, Serial No. 322,823, filed November 26, 1952.

The partitions 12 and 13 adjacent the cells are preferably made out of ion permeable but liquid impermeable material, such as for example, microporous rubber, which is provided with apertures 16 and 17 at one of their lower ends for the passage and return of the cathode and anode rinsing liquid or liquids for protecting the surfaces of the membranes 14 and 15 adjacent the electrodes against being attacked by the products formed in the cells. These electrode rinsing liquids follow the flow path of the arrows 18 and 19 at their inlets and outlets carrying the ions first away from the membranes 14 and 15 and then past the front surfaces of the electrodes 10 and 11, respectively. Further and specific apparatus for protecting these electrodes will be described in my co-pending application Serial No. 380,832, filed on even date herewith.

The inlets of the diluting and concentrating cells are generally made at their bottoms and are shown through ducts 20 and 21, respectively, connecting alternate cells in parallel, so that all of the concentrating cells are connected together and all of the diluting cells are connected together. However, if both diluting and concentrating liquids are the same, the ducts 20 and 21 may be combined. The outlets of the two types of cells are preferably at the top of the apparatus, and are separately multipled together through ducts 23 and 22, respectively, one carrying the dialysate or diluting liquid which has been desalted, and the other carrying the other or concentrating liquid with the increased amount of salts.

Referring now to Figs. 2 and 3, a portion of such multicell apparatus as schematically shown in Fig. 1, is shown in vertical section with inlet duct 20 and outlet duct 23 through a housing 10' with one of the electrodes 10 countersunk therein to form a concentrating chamber between it and the first membrane 14. These ducts 20 and 23 are connected directly to the first and second cells, respectively, as shown in Fig. 2. The inlet and outlet ducts are formed by aligned holes or apertures in each of the membranes 14 and 15. In Fig. 3 these membranes 14 and 15 are shown to be rectangular with four holes located near their corners, alternate pairs of which holes are connected together. That is, the holes 20 and 22 connect membrane 15 to membrane 14 (not shown) at portions 25 extending radially for about a half inch around their edges, such as by a glue, to form the inlet 20 and outlet 22 for the cell behind the one cell shown in section in Fig. 3; while the holes in the opposite corners form the inlet 21 and outlet 23 for the cell sectioned in Fig. 3. The portions 25 are preferably glued together by a waterproof glue such as a urea formaldehyde glue which may be hardened at low temperature. However, the membranes themselves may be made of thermoplastic material, and pressed together with heat.

Thus, the apertures in one pair of diagonally opposite corners of each membrane have their edges on one side of the membrane fastened or connected in a watertight manner to the edges of the corresponding apertures of the adjacent membrane on that side, and the apertures in the other pair of diagonally opposite corners of the same membrane have their edges on the other side of said membrane fastened or connected in a watertight manner to the edges of the corresponding apertures of the adjacent membrane on said other side, to form a sort of an accordion stack of membrane sheets.

In order to keep the spacing between the membranes uniform and as small as possible, spacing members 30 of plastic material, such as polyvinyl chloride, are preferably placed between each of the adjacent membranes 14 and 15. These spacers 30 may be corrugated and may also contain holes 31. The corrugations of these spacers 30 may be placed perpendicular to the flow of the liquids passed from the inlet to the outlet of each cell, to channel the liquid so that it will be well distributed throughout the whole flat volume of each cell (see Van Hoek co-pending application Serial No. 341,559, filed March 10, 1953).

In order to clamp and space the edges of each of the membranes 14 and 15 to form the cells, frames 50, shown in Figs. 2 and 3, may be preferably placed between each of the membranes. These frames may be made of a surface insulated metal or of hard rubber, and may be made as thin as desired since no inlet or outlet ducts need to be formed in their thin edges. Thus, the frames themselves may be made the same thickness as the distance which is to be employed between the main surfaces of membranes of the cells, which distance may be as small as about $3/10$ of a millimeter.

If the inlets 20 and 21 are joined together, or the liquid to be diluted and concentrating liquid are the same, it is not necessary to provide separate apertures at the bottom of each of the membranes for them, in that one aperture for the inlet of both liquids would suffice. A modification of a cell with such a common inlet 26 in membranes 14' and 15' (corresponding to membranes 14 and 15) is shown in section in Figs. 4 and 5 in which said common inlet 26 is provided at the bottom of the cell, but the outlets 22 and 23 remain the same as those disclosed in the embodiment of Fig. 3. However, in this modification the corrugations of the spacing member 35 (corresponding to member 30) preferably run at a different angle to those in Fig. 3, so as to be more perpendicular to the flow between the inlet 26 and the outlet 22 of the cell section shown in Fig. 5. Correspondingly, in order to prevent stagnant corners for liquids in the cell, the frame member 51 (corresponding to frame 50) and the housing 52 (corresponding to 10') for electrode 10'', may be filled-in across the bottom corners to surround the inlet 26 as shown in Fig. 5. This, however, cuts off somewhat the effective surfaces of each of the cells.

Further in this modification of Figs. 4, 5 and 6 the edges 25 around the outlet holes or apertures in the membranes 14' and 15' may be held together only by pressure exerted by relatively thick resilient pressing members 40, as shown in Fig. 7, which permit fluids to pass through them both transversely and radially. These pressing members are inserted in the spaces between the aligned outlets as shown in Figs. 4, 5 and 6, and may comprise a pair of stiff annular plates 42 and 43 made of stainless steel or hard plastic material, which plates may have glued or otherwise fastened between them a resilient porous material, such as rubber pellets or a plastic corrugated sheet 44, which also may preferably be provided with holes 45, similar to spacers 30. It is desirable that the spacing members 40 shown in Fig. 7 are thicker than double the distance between the membranes 14' and 15', so that when they are stacked together, as shown in Figs. 5 and 6 they press and hold together the edges of the holes in the membranes sufficiently tight to insure a liquid tight seal at the portions 25.

This modification of employing pressing members 40 instead of just glueing the portions 25 together, may also be applied to both the inlets and outlets in the embodiment shown in Figs. 2 and 3, either instead of the glue or together with it, without departing from the scope of this invention.

Instead of fastening the adjacent pairs of membranes 14 and 15 together as shown in Figs. 2 through 6, these membranes may be held against opposite sides of diagonally opposite apertured corners of alternate frames, such as frames 60 shown in Fig. 8, having diagonally opposite filled-in corners 61 provided with apertures 62, which apertures 62 align with the inlet and outlet ducts 20 through 23 of the membranes 14 and 15. A section of such a frame 60, similar to that section shown in Fig. 6 is shown in Fig. 9 in which the membrances 14 and 15 are shown clamped between three frames 60, and the apertures 62 in the corners of the frames press against the pressing members 40' (corresponding to members 40 in Fig. 7), which hold the membranes 14 and 15 against the faces of the portions 61 of alternate frames 60 in fluidtight contact. In this modification there is no need for sealing the membranes themselves to each other, but they may be maintained entirely flat and parallel and held, or, if desired, also sealed or glued to the surfaces of the portions 61 which they contact. The inlets and outlets of the cells are thus between the corrugations and/or holes in the member 44' of the pressing members 40', which members 40' in this embodiment may be thinner than those employed in the embodiments of Figs. 4, 5 and 6.

Accordingly, by the employment of the means for fastening together and sealing the inlets and outlets of respective membranes in a multi-cell electrodialysis apparatus of the type disclosed in this invention, there may be provided very small distances between adjacent membranes in the cells, which materially increases the efficiency and effectiveness of the cell over the cells which have been previously known. The present construction, accordingly, enables the frames for the cells to be used again after the membranes have been worn out, in that new membranes can be readily inserted between the old frame members. The frame members preferably also are made of hard resilient material, such as hard rubber, so that when they are pressed together, they will form good fluidtight seals for the edges of each one of the liquid cells, as well as good seals at their inlets and outlets spaced by the pressing members 40 or 40'. This also enables quick assembly of many cells in a single apparatus.

While there is described above the principles of this invention in connection with specific apparatus, it is to be clearly understood that this description is made only by way of example and not as a limitation to the scope of this invention.

What is claimed is:

1. A multi-cell dialysis apparatus having a plurality of alternate diluting and concentrating cells separated by a plurality of parallel membrane sheets, each cell being bounded by a frame means free from apertures extending parallel to said membrane sheets, at least three spaced parallel holes passing through said sheets forming apertures in each of said membranes, a first means for connecting the adjacent edges of successive adjacent pairs of apertures of said membranes forming one of said holes, and a second means for connecting the adjacent edges of successive adjacent other pairs of apertures of alternate membranes forming another of said holes, whereby said first means connect all of said diluting cells together and said second means connect all of said concentrating cells together.

2. The apparatus of claim 1 wherein said first and second means comprise a waterproof glue.

3. An apparatus according to claim 1 wherein two of said parallel holes comprise separate outlets to each of the cells and said other hole comprises an inlet for all of the cells.

4. An apparatus according to claim 1 having four holes, one pair for the inlets to respective alternate cells, and the other pair for the outlets of the same respective alternate cells.

5. An apparatus according to claim 1 including a corrugated spacer between each of said membranes to uniformly space and maintain said membranes in parallel relationship to each other between the edges of the frame and said holes.

6. An apparatus according to claim 1 including pressing members between the edges of the holes of adjacent membranes which are not connected together and which permit the passage of liquids to and from said cells.

7. An apparatus according to claim 6 wherein said pressing members comprise two annular plates aligned with the edges of said apertures of said membranes, and a resilient porous spacing member between said plates.

8. An apparatus according to claim 1 wherein each said frame means for mounting said membranes includes at least two apertures corresponding to and aligned with said soles, wherein said first and second means include pressing means between said edges of the aligned apertures in said membranes to press them against the edges of said apertures in said frame means.

9. A multi-cell electrodialysis apparatus having a plurality of parallel alternate diluting and concentrating cells separated by common membranes, each cell being bounded by frame means free from apertures extending parallel to said membranes, said membranes each having at least three spaced apertures in the same relative location on each membrane to provide three parallel holes through said plurality of membranes, means for connecting together the adjacent edges of successive adjacent pairs of membrane apertures forming one hole of aligned apertures to connect all of said diluting cells together, and separate similar means for connecting together the adjacent edges of successive adjacent pairs of membrane apertures forming another hole of aligned apertures to connect all of said concentrating cells together.

10. A multi-cell dialysis apparatus having a plurality of alternate diluting and concentrating cells separated by a plurality of parallel membrane sheets, four spaced parallel holes passing through said sheets forming four spaced apertures in each of said membranes, a first means for connecting the edges of one pair of apertures on one side of one of said membrane sheets to the edges of the corresponding pair of apertures on the next adjacent membrane sheet on said one side of said one membrane sheet, and a second similar means for connecting the edges of the other pair of apertures on the other side of said one membrane sheet to the edges of the corresponding pair of apertures on the next adjacent membrane sheet on said other side of said one membrane sheet, whereby all of said membrane sheets are connected together like an accordion to connect all of said diluting cells together and all of said concentrating cells together into two separate groups of cells.

11. A dialysis apparatus for continuous dialyzing fluids comprising: a plurality of parallel membranes which form a plurality of alternate diluting and concentrating cells, each cell being bounded by frame means free from apertures extending parallel to said membranes, said membranes each having at least three apertures aligned with the corresponding apertures of the other membranes to form at least three holes through said membranes, one of said holes forming the outlets for diluting cells, another of said holes forming the outlets for said concentrating cells, and the remaining of said holes forming inlets to said cells, means connecting the edges of the apertures of adjacent pairs of said membranes along said one of said holes to seal off said concentrating cells from said outlets of said diluting cells, and means connecting the edges of the apertures of other and alternate adjacent pairs of said membranes along said other of said holes to seal off said diluting cells from said outlets of said concentrating cells.

12. A multicell electrodialysis apparatus comprising a plurality of liquid spaces constituting alternatively diluting cells and concentrating cells, the diluting cells being separated from the concentrating cells by parallel membranes, the membranes having at least three apertures constituting at least three rows of apertures aligned perpendicular to the membrane surfaces, at least two of the rows of apertures in alignment forming each a common liquid passage for alternate cells by joining together in substantial contact the borders of each adjacent pair of said apertures.

13. An apparatus according to claim 12 wherein the borders of each pair of said apertures are held in contact with each other by a glue.

14. An apparatus according to claim 12 wherein one of said rows of apertures in alignment forming a common liquid passage of the concentrating cells constitutes a common outlet of the concentrating cells, a second of said rows of apertures in alignment forming a liquid passage of the diluting cells constitutes a common outlet of the diluting cells, and the third of said rows of apertures the borders of which are substantially free from each other constitutes a common inlet for all the cells.

15. An apparatus according to claim 12 having four rows of holes in alignment in the membranes, each row forming a common liquid passage of alternate cells, one of said rows constituting an inlet of the concentrating cells, the second row constituting an inlet of the diluting cells, the third row constituting an outlet of the concentrating cells, and the fourth row constituting an outlet of the diluting cells.

16. An apparatus according to claim 12 wherein the borders of each said pair of apertures is held in contact with each other by pressing members positioned at both sides against each said pair of apertures.

17. An apparatus according to claim 12 wherein said pressing members comprise two plates having apertures in alignment with the apertures in said membranes, the borders of which membrane apertures are to be held in contact with each other, said plates being spaced by a liquid permeable resilient layer.

References Cited in the file of this patent

UNITED STATES PATENTS

| | | |
|---|---|---|
| 2,225,024 | Weber | Dec. 17, 1940 |
| 2,631,100 | Aten | Mar. 10, 1953 |
| 2,694,680 | Katz | Nov. 16, 1954 |

FOREIGN PATENTS

| | | |
|---|---|---|
| 682,703 | Great Britain | Nov. 12, 1952 |